United States Patent [19]
West et al.

[11] Patent Number: 5,453,863
[45] Date of Patent: Sep. 26, 1995

[54] MULTISTABLE CHIRAL NEMATIC DISPLAYS

[75] Inventors: John West, Munroe Falls; Deng-Ke Yang, Kent, both of Ohio

[73] Assignee: Kent State University, Kent, Ohio

[21] Appl. No.: 57,662

[22] Filed: May 4, 1993

Related U.S. Application Data

[63] Continuation-in-part of Ser. No. 694,840, May 2, 1991, abandoned, and a continuation-in-part of Ser. No. 885,154, May 18, 1992, Pat. No.5,384,067, and a continuation-in-part of Ser. No. 969,093, May 2, 1991.

[51] Int. Cl.$^6$ .............................. G02F 1/137; G02F 1/13
[52] U.S. Cl. ............................. 359/91; 359/102
[58] Field of Search ................ 359/91, 90, 102, 359/101

[56] References Cited

U.S. PATENT DOCUMENTS

| | | | |
|---|---|---|---|
| 3,585,389 | 6/1971 | Hodson et al. | 250/47 |
| 3,600,060 | 8/1971 | Churchill et al. | 350/160 |
| 3,620,889 | 11/1971 | Baltzer | 161/5 |
| 3,650,603 | 3/1972 | Heilmeier et al. | 350/160 |
| 3,680,950 | 8/1972 | Haas et al. | 350/150 |
| 3,703,331 | 11/1992 | Goldmacher et al. | 350/160 |
| 3,711,713 | 1/1973 | Wysocki et al. | 250/83 |
| 3,795,529 | 3/1974 | Cartmell et al. | 117/1.7 |
| 3,816,786 | 6/1974 | Churchill et al. | 313/91 |
| 3,821,720 | 6/1974 | Greubel et al. | 340/173 |
| 3,871,904 | 3/1975 | Haas et al. | 117/72 |
| 3,885,982 | 5/1975 | Fergason et al. | 106/252 |
| 3,891,307 | 6/1975 | Tsukamoto et al. | 350/160 |
| 3,947,183 | 3/1976 | Haas et al. | 350/160 |
| 3,969,264 | 7/1976 | Davis | 252/299 |
| 4,022,706 | 5/1977 | Davis | 252/299 |
| 4,070,912 | 1/1978 | McNaughton | 73/356 |
| 4,077,260 | 3/1978 | Gray et al. | 73/356 |
| 4,097,127 | 6/1978 | Haas et al. | 350/332 |
| 4,252,417 | 2/1981 | Scheffer et al. | 350/349 |
| 4,408,201 | 10/1983 | Harada | 340/784 |
| 4,447,132 | 5/1984 | deZwart | 350/346 |
| 5,384,067 | 1/1995 | Doane et al. | 359/91 |

FOREIGN PATENT DOCUMENTS

| | | |
|---|---|---|
| 423881 | 4/1991 | European Pat. Off. . |
| 451905A | 10/1991 | European Pat. Off. . |
| 63-206724 | 8/1988 | Japan ................ 359/102 |
| 1161039 | 8/1969 | United Kingdom . |

OTHER PUBLICATIONS

J. P. Hulin, Parametric Study of Optical Storage Effect in Mixed Liquid–Crystal Systems; Nov. 15, 1972; Appl. Phys. Lett. vol. 21 pp. 455–457.

Wysocki et al., Electric–Field–Induced Phase Change in Cholestric Liquid Crystals, Physical Review Letters, vol. 20, #19, pp. 1024–1025 May 6, 1968.

John Muller, Effects of Electric Fields on Cholesterol Nonanoate Liquid Crystals, Molecular Crystals, 1966, vol. 2, pp. 167–188.

W. J. Harper, Voltage Effects in Cholesteric Liquid Crystals, Molecular Crystals, 1966, vol. 1, pp. 325–332.

Pelqi Jiang, Electro–Optics of Multi–Cholesteric Focal Conic Texture w/Polymer, Chemistry Express, 1991, vol. 6, No. 12, pp. 1005–1008.

G. W. Gray, Dyestuffs & Liquid Crystals, Chimia 34, No. 2 Feb. 1980, pp. 47–58.

(List continued on next page.)

*Primary Examiner*—Anita Pellman Gross
*Assistant Examiner*—Charles Miller
*Attorney, Agent, or Firm*—Watts, Hoffmann, Fisher & Heinke Co.

[57] ABSTRACT

A light modulating reflective cell comprising a polymer-free chiral nematic liquid crystalline light modulating material is disclosed. The cell includes nematic liquid crystal having positive dielectric anisotropy and chiral material in an amount effective to form focal conic and twisted planar textures. The chiral material has a pitch length effective to reflect light in the visible spectrum, wherein the focal conic and twisted planar textures are stable in the absence of a field and the liquid crystal material is capable of changing textures upon the application of a field.

10 Claims, 3 Drawing Sheets

OTHER PUBLICATIONS

W. Greubel et al., Electric field Induced Texture Changes in Certain Nematic/Cholesteric Liquid Crystal Mixtures, Molecular Crystals and Liquid Crystals, 1973 vol. 24–pp. 103–111.

Gary A. Dir et al., Cholesteric Liquid Crystal Texture Change Displays, Proc. S.I.D. vol. 13/2, second quarter, 1972 pp. 105–112.

Wysocki J., Electric–Field Induced Phase Changes in Cholesteric Liquid Crystals, Research Laboratories, Xerox Corp. pp. 47–63 unknown date.

Paul Gerber, Voltage–Induced Cholesteric Structure–Transformation in Thin Layers, Z. Naturforsch, 1981, pp. 718–726.

R. A. M. Hikmet, Structure of Cholestric gels and their electrically induced light scattering and colour changes, Liquid Crystals, 1992, vol. 12, No. 2, pp. 319–336.

Heilmeier, George—A New Electric Field Controlled Reflective Optical Storage Effect in Mixed Liquid Crystal Systems Proc. IEEE vol. 57 No. 1 1969, pp. 34–38.

Donald White, New Absorptive Mode Reflectius Liquid–Crystal display— Device—Journal of Applied Physics 1974 vol. 45—No. 11—pp. 4711–4723.

D. K. Yang et al.—Cholesteric Liquid Crystal/Polymer Dispersion for Haze Free Shutters—Appl. Phys. Lett. 60 Jun. 22, 1992 pp. 3102–3104.

J. W. Doane et al.—Current Trends in Polymer Dispersed Liquid Crystal, 1991 IEEE pp. 175–178.

J. W. Doane, Front–lit Panel Display from Polymer Stabilized Cholesteric Textures—date unknown.

D. K. Yang et al.—Cholesteric Liquid Crystal/Polymer Gel Dispersion Bistable at Zero Field,—CH–3071–8/91 0000–0049 1991 IEEE pp. 49–52.

D. K. Yang & J. W. Doane—Cholesteric Liquid Crystal/Polymer Gel Dispersion Refelective Display Application—1992.

Alieu, F. M., Three States of a Cholesteric Liquid Crystal in Micropores, CA Selects–Liquid Crystals, Issue 12, 1985–pp. 1–7.

S. Candau et al.,–Magnetic Field Effects in Nematic and Cholesteric Droplets Suspended in a Isotropic Liquid, Molecular Crystals and Liquid Crystals—1973—vol. 23—pp. 283–297.

MULTISTABLE CHIRAL NEMATIC DISPLAYS

This application was made in part with Government support under cooperative agreement number DMR 89-20147 awarded by the National Science Foundation. The Government has certain rights in this invention.

This application is a continuation in part of U.S. Serial No. 07/694,840 filed May 2, 1991, now abandoned, incorporated herein by reference, U.S. Serial No. 07/885,154, filed May 18, 1992, now U.S. Pat. No. 5,384,067, incorporated herein by reference and U.S. Serial No. 07/969,093, filed May 2, 1991, pending incorporated herein by reference.

BACKGROUND OF THE INVENTION

Technical Field

The present invention relates generally to liquid crystalline light modulating devices, and more specifically to new polymer free liquid crystalline display cells and materials which exhibit different optical states under different electrical field conditions and are characterized by a unique combination of properties, including optical multistability and haze-free light transmission at all viewing angles in both a field-ON or field-OFF mode.

Electrically switchable liquid crystal films intended for use in electrooptical devices have been prepared using various types and concentrations of liquid crystal and polymer. One such technique involves imbibing liquid crystal into micropores of a plastic or glass sheet. Another technique involves evaporation of water from an aqueous emulsion of nematic liquid crystal in a solution of water-soluble polymer such as polyvinyl alcohol or in a latex emulsion.

A different procedure offering significant advantages over mechanical entrapment techniques and the emulsification procedure involves phase separation of liquid crystal from a homogeneous solution with a suitable synthetic resin to form a liquid crystal phase interspersed with a polymer phase. These types of films, some of which are referred to as PDLC, have been shown to be useful in many applications ranging from large area displays and switchable coatings for windows to projection displays and high-definition television.

All of the above-noted materials and procedures have the disadvantage of requiring numerous and expensive reagents and starting materials. The various imbibing, emulsification or polymerization procedures associated with these systems significantly add to the cost and complexity of their manufacture. Moreover, when significant amounts of polymer are used, they begin to exhibit the characteristic drawback of "haze" at increasing oblique viewing angles until an essentially opaque appearance is detected at an oblique enough angle due to the perceived mismatch between the effective index of refraction of the liquid crystal and the refractive index of the polymer.

In the parent application it was found that good color reflective displays could be prepared using chiral nematic liquid crystal and polymer. These displays had the advantages of exhibiting multiple stable color reflecting states and, when the amount of polymer was low, haze free viewing. However, in spite of their many advantages, these displays still require the use of polymers and hence, have the drawbacks associated therewith.

Surprisingly, it has now been discovered that a polymer free multistable color reflecting cell can be prepared that exhibits stable color reflecting and light scattering states with multiple stable optical states therebetween characterized by varying degrees of intensity of reflection. Depending upon the voltage of the electric field addressing pulse, the material can be switched between these multiple optical states, all of which are stable in the absence of an applied field.

DISCLOSURE OF THE INVENTION

An important feature of the invention is that a reflective color display cell can be prepared without polymer so that it exhibits multiple optically different states, all of which are stable in the absence of an applied field. The display can be driven from one state to another by an electric field. Depending upon the magnitude and shape of the electric field pulse, the optical state of the material can be changed to a new stable state which reflects any desired intensity of colored light along a continuum of such states, thus providing a stable "grey scale." Surprisingly, these materials can be prepared without the need for polymers and the added expense and manufacturing complexities associated therewith.

Generally, a sufficiently low electric field pulse applied to the material results in a light scattering state which is white in appearance. In this state, a proportion of the liquid crystal molecules have a focal conic texture as a result of competition between any surface effects, elastic forces and the electric field. After application of a sufficiently high electric field pulse, i.e., an electric field high enough to homeotropically align the liquid crystal directors, the material relaxes to a light reflecting state that can be made to appear as green, red, blue, or any pre-selected color depending upon the pitch length of the chiral nematic liquid crystal. The light scattering and light reflecting states remain stable at zero field. By subjecting the material to an electric field in between that which will switch it from the reflecting state to the scattering state, or vise versa, one obtains stable grey scale states characterized by varying degrees of reflection in between that exhibited by the reflecting and scattering states. When the chiral nematic liquid crystal is in a planar colored light reflecting texture and an intermediate electric field pulse is applied, the amount of material in the planar texture, and the intensity of reflectivity of the colored light, decrease. Similarly, when the material is in the focal conic texture and an intermediate electric field pulse is applied, the amount of material in the planar texture will increase as will the intensity of reflection from the cell. When the electric field is removed, the material is stable and remains in the established texture to reflect that intensity of light indefinitely, regardless of which texture it started from.

If an electric field high enough to homeotropically align the liquid crystal directors is maintained, the material is transparent until the field is removed. When the field is turned off quickly, the material reforms to the light reflecting state and, when the field is turned off slowly, the material reforms to the light scattering state. In each case, the electric field pulse is preferably an AC pulse, and more preferably a square AC pulse, since a DC pulse will tend to cause ionic conduction and limit the life of the cell.

While not wanting to be bound by theory, it is believed that when the voltage is applied, a proportion of the material enters a turbid phase while the field is on. Those portions of the material that exhibit the turbid phase tend to relax to a focal conic, light scattering texture upon removal of the field. Those portions of the material unaffected by the field, i.e., those portions that do not enter the turbid phase, remain in the planar, light reflecting texture. The amount of light reflected from the cell depends on the amount of material in the planar reflecting texture. When the voltage of the electric field is increased, a higher proportion of the material enters the turbid phase while the field is on, followed by relaxation to the focal conic texture when the field is removed. Since the reflection from the cell is proportional to the amount of material in the planar reflecting texture, reflection from the cell decreases along a grey scale as a result of an increase in the magnitude of the field because more of the material enters the turbid phase and is switched to the focal conic texture. At a certain threshold voltage, which depends upon the material, substantially all of the material is switched to the focal conic texture upon removal of the field, characterized by a light scattering condition where the reflectivity of the cell is at or near a minimum. When the voltage is removed, the assumed texture is stable and will remain scattering indefinitely. When the voltage is increased further, to a point high enough to untwist the liquid crystal and homeotropically align the liquid crystal directors, the material is transparent and will remain transparent until the voltage is removed. From the homeotropic texture, the material tends to relax to the stable color reflecting planar texture upon removal of the field.

When the material is in a light scattering focal conic texture and a low voltage pulse is applied, the material begins to change texture and again stable grey scale reflectivities are obtained. Since the material here starts in the scattering focal conic texture, the grey scale reflectivities are characterized by an increase in the reflectivity from that exhibited when substantially all of the material is in the scattering focal conic texture, although it has been observed that the reflectivity may initially decrease in some samples. The increase in reflectivity is believed to be attributable to proportions of the material that become homeotropically aligned as a result of the applied field. Those proportions that are homeotropically aligned relax to a stable planar light reflecting texture upon removal of the field, while the remainder of the material exhibits the turbid phase as a result of the field and relaxes back to the focal conic texture upon removal thereof. When the voltage is increased still further, to the point of homeotropically aligning substantially all of the liquid crystal, the material again appears clear and relaxes to the stable planar color reflecting texture upon removal of the field.

In short, it is believed that those proportions of the material that enter the turbid phase as the result of an applied field relax to a stable focal conic texture upon removal of the field, and those portions that become homeotropically aligned due to the application of an applied field relax to a stable planer texture upon removal of the field. It is believed that the material returns to the scattering focal conic state when a high electric field is slowly removed from the homeotropically aligned liquid crystal because slow removal takes the material into the turbid phase from which it seems to consistently relax to a focal conic texture after removal of a field. When a high field is removed quickly, the material does not enter the turbid phase and thus, relaxes to the planar reflecting texture. In any case, it can be seen that electric field pulses of various magnitudes below that necessary to drive the material from the stable reflecting state to the stable scattering state, or vise versa, will drive the material to intermediate states that are themselves stable. These multiple stable states indefinitely reflect colored light of an intensity between that reflected by the reflecting and scattering states. Thus, depending upon the magnitude of the electric field pulse the material exhibits stable grey scale reflectivity without the need for polymer. The magnitude of the field necessary to drive the material between various states will, of course, vary depending upon the nature and amount of the particular liquid crystal and thickness of the cell. Application of mechanical stress to the material can also be used to drive the material from a light scattering to a light reflecting state.

A major advantage of the multistable material is that it does not require an active matrix to make a high-definition flat panel screen. The screen can be prepared without active elements at each pixel site and a multiplexing scheme used to address the display. This greatly simplifies production, increases yield and reduces the cost of the display. Since the material does not require polymer, even greater simplification of production and cost savings are realized by the invention. Other advantages of the present invention are that the light scattering and light reflecting states are stable without requiring polymer or delicate surface conditions of the substrate. Display devices made with the material of the invention do not require polarizers which limit the brightness of the displays and color is introduced by the material itself without the need of color filters which also can reduce brightness.

The advantageous properties described above are achieved in the invention by providing a light modulating reflective cell comprising a polymer free chiral nematic liquid crystalline light modulating material, including nematic liquid crystal having positive dielectric anisotropy and chiral material in an amount effective to form focal conic and twisted planar textures having a pitch length effective to reflect light in the visible spectrum, wherein the focal conic and twisted planar textures are stable in the absence of a field and the liquid crystal material is capable of changing textures upon the application of a field.

The addressing means can be of any type known in the art, such as an active matrix, a multiplexing circuit, electrodes and lasers. As a result, the new material can be made to exhibit different optical states, i.e., light transmitting, light scattering, light reflecting and stable grey scale in between these states, under different field conditions without the need for polymer and the complicated manufacturing processes associated therewith.

The chiral nematic liquid crystal is a mixture of nematic liquid crystal. having positive dielectric anisotropy and chiral material in an amount sufficient to produce a desired pitch length. Suitable nematic liquid crystals and chiral materials are commercially available and would be known to those of ordinary skill in the art in view of this disclosure. The amount of nematic liquid crystal and chiral material will vary depending upon the particular liquid crystal and chiral material used, as well as the desired mode of operation.

The wavelength of the light that is reflected by the material is given by the relation $\lambda=np$, where n is the average refractive index and p is the pitch length. Wavelengths between about 350 nm and 850 nm are in the visible spectrum. Accordingly, one of ordinary skill in the art will be able to select appropriate materials for the invention based upon the refractive indices of the materials involved and on general principles of chiral doping of liquid crystals to obtain optimum pitches, for example, the procedures taught in the manual distributed by Hoffmann-La Roche, Ltd., entitled How to Dope Liquid Crystal Mixtures in Order to Ensure Optimum Pitch and to Compensate the Temperature Dependence, Schadt et. al., (1990), incorporated herein by reference.

In a preferred embodiment the pitch length of the chiral nematic liquid crystal is in a range of from about 0.25 to about 1.5 microns, more preferably from about 0.45 to about 0.8 microns. Typical pitch lengths are 0.27 microns for blue color, 0.31 microns for green color and 0.40 microns for red color. Moreover, the chiral nematic liquid crystal preferably contains from about 20 to about 60% by weight chiral material based on the combined weight of nematic liquid crystal and chiral material and, still more preferably, from about 20 to about 40% by weight chiral material based on the combined weight of nematic liquid crystal and chiral material. The ranges can vary, however, depending upon the chiral material and liquid crystal. The nematic liquid crystal preferably has a positive dielectric anisotropy of at least about 5 and more preferably at least about 10. It will be understood that the weight amounts can vary depending upon the particular liquid crystal and chiral material used.

In carrying out the invention, the solution containing the desired amounts of nematic liquid crystal and chiral material is prepared and introduced between cell substrates, at least one of which is transparent. The cell is then sealed around its edges with, for example, epoxy or other materials known in the art. The cell can be filled by methods known to those of ordinary skill in the art, such as by capillary action. A preferred technique is to vacuum fill the cells. This improves cell uniformity and eliminates bubbles in the cell. For electrically addressable cells the cell walls are coated with transparent electrodes, such as indium tin oxide, prior to the introduction of the liquid crystal.

While not necessary to the invention, in some instances it is desirable to treat the cell walls with materials in addition to the electrodes, such as detergent or chemicals, to obtain variations in the contrast or switching characteristics. These treatments can be used to affect the uniformity of the liquid crystal, alter the stability of the various textures and to alter the strength of any surface anchoring. In addition to using a wide variety of materials for such surface treatments, the treatments on opposite substrates may differ. For example, the substrates may be rubbed in different directions, one substrate may include the additional treatment while the other substrate does not, or opposite substrates may be treated with different materials. As noted above, such additional treatments can have the effect of altering the characteristics of the cell response.

Optionally, other additives may be included in the chiral nematic liquid crystal mixture to alter the characteristics of the cell. For example, while color is introduced by the liquid crystal material itself, pleochroic dyes may be added to intensify or vary the color reflected by the cell. Similarly, additives such as fumed silica can be dissolved in the liquid crystal mixture to adjust the stability of the various cholesteric textures.

The invention also features an improved method of addressing a polymer free chiral nematic liquid crystal material capable of being switched between a color reflecting state that reflects a maximum reference intensity, and a light scattering state exhibiting a minimum reference intensity. The improvement comprises applying voltage pulses of varying magnitude sufficient to achieve color reflectivity between said maximum and minimum, thereby producing stable grey scale reflectance from the material.

Preferably the method is characterized by subjecting the material to an AC pulse of sufficient duration and voltage to cause a proportion of said chiral nematic material to exhibit a first optical state and the remaining proportion of the chiral nematic material to exhibit a second optical state that is different than the first state. In the preferred embodiment, the proportion of the material in the first optical state exhibits the planar texture and the remainder of the material in the second optical state exhibits the focal conic texture, the intensity of reflection being proportional to the amount of the material in the planar reflecting texture.

Many additional features, advantages and a fuller understanding of the invention will be had from the following detailed description of preferred embodiments and the accompanying drawings.

DESCRIPTION OF PREFERRED EMBODIMENTS

Figure 1:
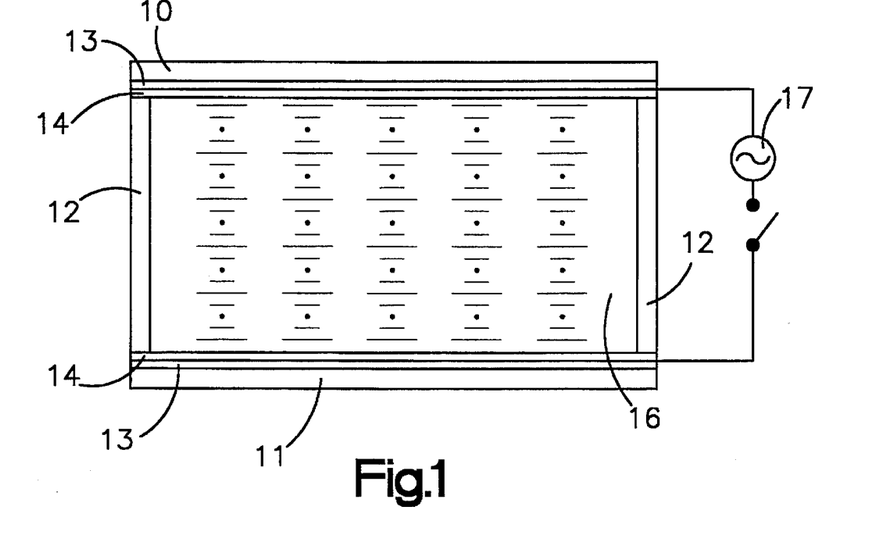
FIG. 1 is a diagrammatic, cross-sectional illustration of a light modulating cell incorporating the liquid crystalline material of the invention.
Figure 2:
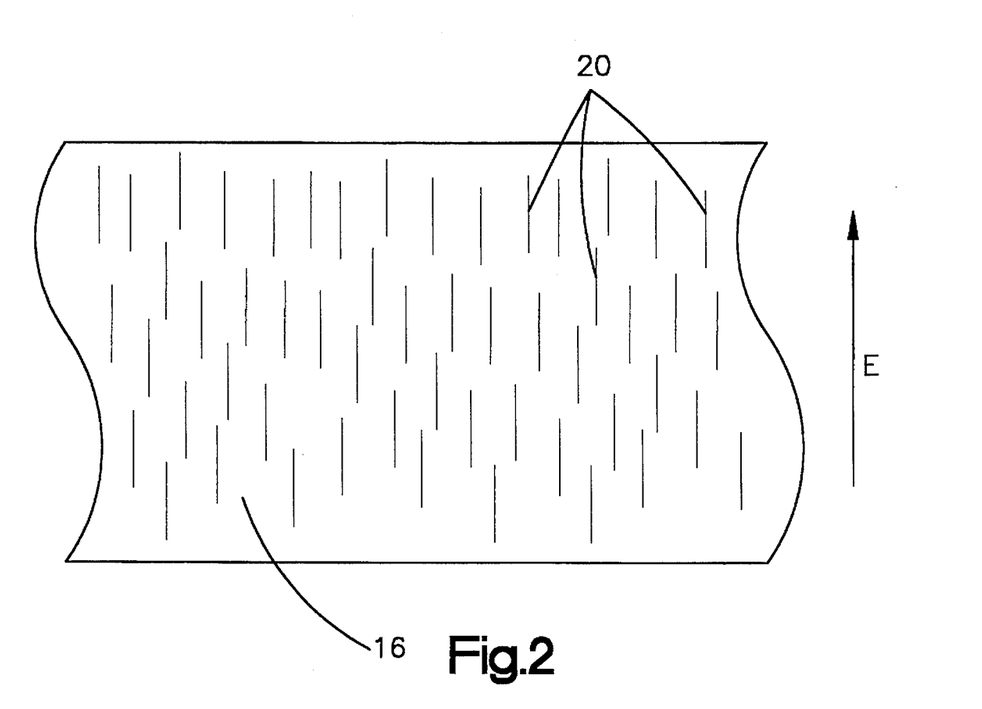
FIG. 2 is a diagrammatic, fragmentary, enlarged cross-sectional illustration of the material when the liquid crystal is homeotropically aligned to affect an optically clear state.

The diagrammatically illustrated cell in FIG. 1 comprises glass plates 10, 11 which are sealed around their edges and separated by spacers 12. As shown, the glass plates 10, 11 are coated with indium-tin oxide (ITO) or the like to form transparent electrodes 13. The reference character 14 represents an optional surface coating which can be applied to the electrodes in order to affect the liquid crystal directors, or to alter the contrast, reflection or switching characteristics of the cell. The opposite coatings 14 may be the same material or different material, may be rubbed in different directions, or one or both of the coatings 14 may be eliminated altogether.

The cell of FIG. 1 is filled with the polymer free liquid crystalline material of the invention. The liquid crystalline light modulating material is generally comprised of chiral nematic liquid crystal 16 having nematic liquid crystal with positive dielectric anisotropy and chiral material. An AC voltage source 17 is shown connected to the electrodes 13 in order to switch the cell between different optical states.

It is to be understood that the form of the cell depicted in FIG. 1 has been chosen only for the purpose of describing a particular embodiment and function of the polymer free liquid crystalline material of the invention, and that the material can be addressed in various ways and incorporated in other types of cells. For example, instead of being addressed by externally activated electrodes, the material can be addressed by an active matrix, a multiplexing scheme or other type of circuitry, all of which will be evident to those working in the art. Similarly, the cells can be prepared without the optional surface treatment layers 14.

When the optional surface treatment layers are employed in addition to rubbed or unrubbed ITO or other suitable electrodes for the purpose of altering the characteristics of the cell, a wide variety of materials may be used. Suitable materials include polymethylmethacrylate (PMMA), unrubbed polyimide, polyisobutylmethacrylate, poly-n-butylmethacrylate, polyvinylformal (PVF) and polycarbonate. Both plates may have the same or different materials and may be rubbed, unrubbed or otherwise textured. Similarly, opposite surfaces may be rubbed in different directions or textured in different manners. Best results are obtained with rubbed ITO without any additional surface treatments.

The liquid crystal material comprises a nematic liquid crystal having positive dielectric anisotropy and a chiral material, e.g., cholesteric liquid crystal, but does not contain any polymer. Suitable nematic liquid crystals include, for example, E7, E48, E31 and E80 manufactured by E. Merck, although virtually any cyanobiphenyl known in the art having suitable positive anisotropy will likely suffice. Suitable chiral agents include, for example, CB15, CE2 and TM74A, also manufacture by E. Merck. Other nematic liquid crystals and chiral materials suitable for use in the invention would be known to the skilled artisan in view of the instant disclosure. Other optional components that may be added to the chiral nematic liquid crystal mixture include, for example, fumed silica to adjust the stability of the various textures and dyes to adjust the color.

In a preferred manner of preparing the cell shown in FIG. 1, a solution of the chiral nematic liquid crystal together with any additional dyes or additives and the like is prepared. The solution is then introduced between the glass plates 10, 11, shown here having the optional coatings 14. This can be done by methods known to those of ordinary skill in the art, such as capillary filling and, more preferably, vacuum filling. Once introduced between the plates the cell is sealed around its edges as is known in the art.

Polymer free displays prepared according to the invention capable of being switched between stable planar, focal conic and grey scale states are shown in the following non-limiting examples.

Example 1

A chiral nematic liquid crystal mixture containing 37.5% by weight E48 (nematic liquid crystal from EM Chemicals) and 62.5% by weight TM74A (chiral additive from EM Chemicals) was prepared. A one inch square cell was then formed from two substrates coated with ITO. The ITO coatings of both substrates were buffed parallel to each other. 10 μm glass spacers were sprayed onto one substrate and the second substrate was sandwiched so that two of its edges overlapped the first substrate and the cell held together with clamps. Five minute epoxy (Devcon) was then used to seal the two nonoverlapping edges.

The cell was held vertically and a bead of the chiral nematic liquid crystal was placed along the top open edge of the cell. The cell then filled spontaneously by capillary action over a period of approximately 15 minutes. Once filled, the residual liquid crystal mixture is removed from the edge and the open edges sealed with five minute epoxy.

The cell was initially in the planar reflecting state. A 100ms lower voltage pulse of about 115 volts and 1 KHz, switched the cell into the focal conic scattering state. A 100 ms higher voltage pulse of about 180 volts, and 1KHz switched the cell back to the planar reflecting state. Both the planar and focal conic states were stable in the absence of a field and the cell exhibited multiple stable grey scale reflecting states between the scattering and reflecting states.

Example 2

A mixture of E48 and TM74A in a weight ratio of 0.6:1 was introduced between ITO coated glass substrates spaced 10 micrometers apart as in the previous example. The substrates were additionally coated with an unrubbed polyimide layer. The cell was initially in the focal conic, scattering texture that transmitted only about 30% of an HeNe beam through the cell. A 10 ms, 155 volt, 1 KHz Ac pulse switched the cell to a planar texture reflecting green colored light. The transmission from the cell in the reflecting state was about 65%. A 95 volt pulse of the same duration and wavelength switched the cell back to the focal conic, scattering state. The cell switched between states in less than 10ms.

Example 3

A cell was prepared as in the preceding examples with a mixture of CB15, CE2 (chiral materials from EM Chemicals) and E48 nematic liquid crystal in a weight ratio of 0.15:0.15:0.7. In this cell the driving voltage was cut approximately in half because the dielectric anisotropy of the mixture was higher then when TM74A was used. The electro-optic response of this material was similar to that of example 1.

Table I shows numerous additional examples of materials prepared according to the preceding examples. The concentration of chiral material, and the type and concentration of nematic liquid crystal were varied in these cells. In each case the chiral material was a 50:50 mixture of CE2 and CB 15. Each cell employed unrubbed ITO electrodes as the only surface treatment on the substrates. The materials in Table I all exhibited multistability in the visible spectrum, i.e., stable reflecting, scattering and grey scale states.

TABLE I

| Chiral Agent | Nematic LC | Thickness | Color | Multistability | Surface |
| --- | --- | --- | --- | --- | --- |
| 4. CE2/CB15 30% | E48 70% | 10 μm | Red | Yes | ITO |
| 5. CE2/CB15 40% | E48 60% | 10 μm | Grn | Yes | ITO |
| 6. CE2/CB15 50% | E48 50% | 10 μm | Blu | Yes | ITO |
| 7. CE2/CB15 30% | E7 70% | 10 μm | Red | Yes | ITO |
| 8. CE2/CB15 40% | E7 60% | 10 μm | Grn | Yes | ITO |
| 9. CE2/CB15 30% | E31 70% | 10 μm | Red | Yes | ITO |
| 10. CE2/CB15 40% | E31 60% | 10 μm | Grn | Yes | ITO |

Table II shows examples of materials prepared according to the preceding examples exhibiting multistability with varying surface treatment materials and cell thicknesses. In each case the nematic liquid crystal was E31 (EM Chemicals) in an amount of 60% by weight based on the combined weight of nematic liquid crystal and chiral material. The chiral material in each case was a 50:50 mixture of CE2 and CB15 (EM Chemicals) present in an amount of 40% by weight based on the weight of chiral material and nematic liquid crystal. Each cell exhibited a green reflecting state. The reflecting and scattering states were stable in the absence of a field and the cells exhibited stable grey scale states therebetween. In examples 17 and 18, the PVF coatings on opposite substrates were rubbed parallel and perpendicular to each other, respectively. Similarly, the coatings on opposite substrates in examples 22 and 23 were rubbed parallel and perpendicular to each other, respectively. The coatings in examples 21 and 24 were simply unrubbed ITO electrodes, and in the case of example 25, the ITO coatings on opposite substrates were rubbed parallel to each other. The i-butyl and n-butyl in examples 13–15 stand for n-butyl and i-butyl methacrylate, respectively. The spacing in these examples was adjusted by glass spheres as in the preceding examples.

TABLE II

| Surface | Thickness | Multistability |
| --- | --- | --- |
| 11. 100% n-Butyl | 10 μm | yes |
| 12. 100% i-Butyl | 10 μm | yes |
| 13. 75% i-Butyl/25% n-Butyl | 10 μm | yes |
| 14. 25% i-Butyl/75% n-Butyl | 10 μm | yes |
| 15. 50% i-Butyl/50% n-Butyl | 10 μm | yes |
| 16. polyvinyl formal (PVF) | 5 μm | yes |
| 17. PVF rubbed parallel | 5 μm | yes |
| 18. PVF rubbed perpendicular | 5 μm | yes |
| 19. polymethylmethacrylate (PMMA) | 5 μm | yes |
| 20. polycarbonate (PCBR) | 5 μm | yes |
| 21. ITO | 6.7 μm | yes |
| 22. PI rubbed parallel | 6.7 μm | yes |
| 23. PI rubbed perpendicular | 6.7 μm | yes |
| 24. ITO | 10 μm | yes |
| 25. ITO rubbed | 10 μm | yes |

Table III is analogous to Table II in that it provides additional examples of multistable materials obtained as in example 1 with varying surface treatments and cell thicknesses. However, the materials in Table III consisted of TM74A chiral material in an amount of 60% by weight based on the weight of the chiral material and nematic liquid crystal. The nematic liquid crystal was E48 present in an amount of 40% by weight. These cells also reflected green colored light in the planar light reflecting texture and exhibited multistability as in the preceding examples.

TABLE III

| Surface | Thickness | Multistability |
| --- | --- | --- |
| 26. 100% n-Butyl | 10 μm | yes |
| 27. 100% i-Butyl | 10 μm | yes |
| 28. 75% i-Butyl/25% n-Butyl | 10 μm | yes |
| 29. 25% i-Butyl/75% n-Butyl | 10 μm | yes |
| 30. 50% i-Butyl/50% n-Butyl | 10 μm | yes |
| 31. polymethylmethacrylate (PMMA) | 5 μm | yes |
| 32. PMMA rubbed parallel | 5 μm | yes |
| 33. PMMA rubbed perpendicular | 5 μm | yes |
| 34. polycarbonate (PCBR) | 5 μm | yes |
| 35. PCBR rubbed parallel | 5 μm | yes |
| 36. PCBR rubbed perpendicular | 5 μm | yes |
| 37. PI | 10 μm | yes |
| 38. ITO | 10 μm | yes |
| 39. ITO rubbed | 10 μm | yes |

The polymer free multistable color display cells of the invention exhibit a stable grey scale phenomenon characterized by the ability of the material to reflect indefinitely any selected intensity of light between the intensity reflected by the reflecting state and that reflected by the scattering state, the former being when substantially all of the material exhibits the planar texture and the later being when substantially all of the material exhibits the focal conic texture. For purposes of this invention, the reflecting state reflects colored light at a maximum intensity for a given material, the color of the reflected light being determined by the pitch length of the chiral material. An electric field pulse of an appropriate threshold voltage will cause at least a portion of the material to change its optical state and the intensity of reflectivity to decrease. If the AC pulse is high enough, but still below that which will homeotropically align the liquid crystal, the optical state of the material will change completely to the scattering state which reflects light at a minimum intensity for a given material. In between the reflecting state, which for a given material can be considered to define the maximum intensity of reflectivity for that material, and the scattering state, which can be considered to define the minimum intensity of reflectivity, the intensity of reflectivity ranges along a grey scale, which is simply a continuum of intensity values between that exhibited by the reflecting and scattering states. By pulsing the material with an AC pulse of a voltage in between that which will convert the material from the reflecting state to the scattering state, or visa versa, one obtains an intensity of reflectivity in this grey scale range.

While not wanting to be bound by theory, it has been observed that the intensity of reflectivity along the grey scale when the material begins in the planar texture is approximately linearly proportional to the voltage of the pulse. By varying the voltage of the pulse the intensity of reflectivity of a given color can be varied proportionally. When the electric field is removed the material will reflect that intensity indefinitely. It is believed that pulses within this grey scale voltage range cause a proportion of the material to convert from the planar texture characteristic of the reflecting state, to the focal conic texture characteristic of the scattering state. The intensity of reflectivity along the grey scale is proportional to the amount of chiral material switched from the planar texture to the focal conic texture, or vise versa, which is in turn proportional to the voltage of the AC pulse.

Figure 3:
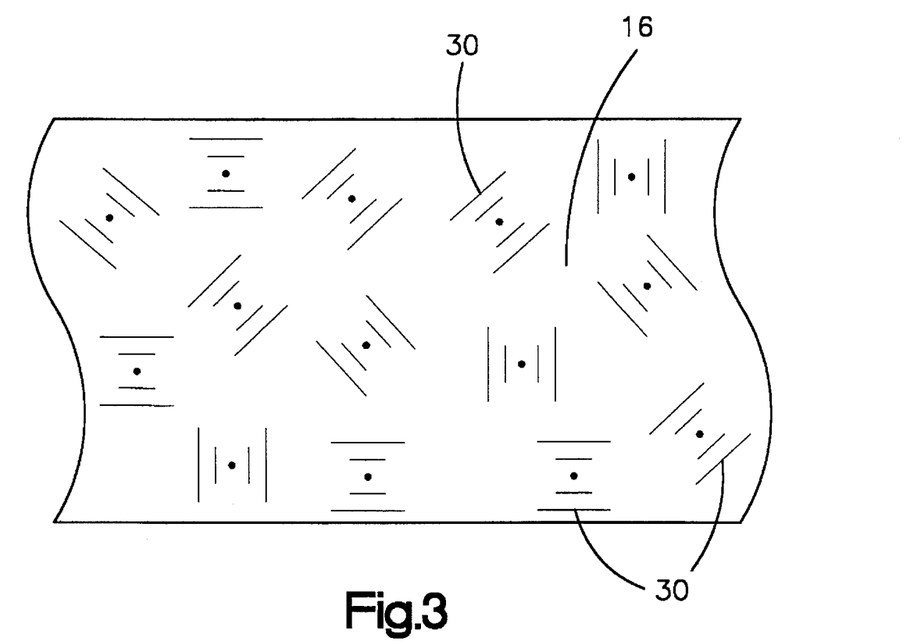
FIG. 3 is a diagrammatic, fragmentary, enlarged cross-sectional illustration of the material in a light scattering state.
Figure 4:
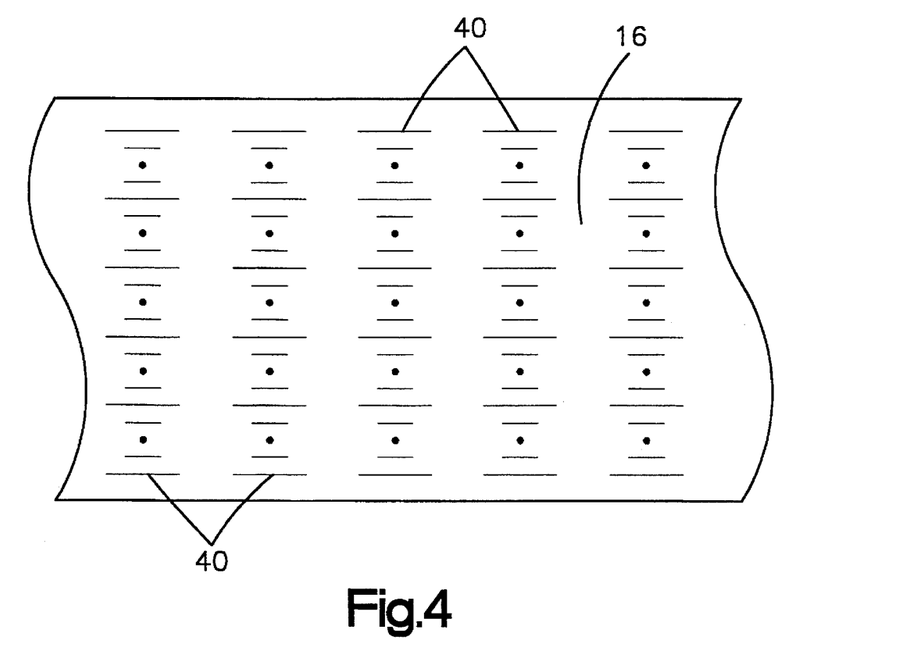
FIG. 4 is a diagrammatic, fragmentary, enlarged cross-sectional illustration of the material when the liquid crystal has a twisted planar texture.

FIG. 4 conceptually illustrates the polymer free multistable material of the invention in its light reflecting state. In this state, the chiral liquid crystal molecules 40 are oriented in a twisted planar structure parallel to the cell walls. Because of the twisted planar texture the material will reflect light, the color of which depends upon the particular pitch length. In this stable reflecting state, the material exhibits maximum reflectivity that constitutes a maximum reference intensity below which the grey scale intensities are observed. The planar texture of the liquid crystal is stable without the presence of polymer. As conceptually illustrated in FIG. 3, the multistable color display material is in its light scattering state. In this stable scattering state the material exhibits its minimum intensity of reflection (i.e., maximum scattering) which defines a minimum reference intensity of reflectivity above which the grey scale intensities are observed.

Both the light reflecting state of FIG. 4 and the light scattering state of FIG. 3, as well as the grey scale states therebetween, are stable in the absence of an electric field. If the material is in the light reflecting state of FIG. 4 and a low electric field pulse is applied, the material will be driven to the light scattering state of FIG. 3 and will remain in that state at zero field. If the multistable material is in the light scattering state of FIG. 3 and a higher electric field pulse sufficient to untwist the chiral molecules is applied, the liquid crystal molecules will reform to the light reflecting state of FIG. 4 at the end of the pulse and will remain in that condition. It is to be understood that the voltages per micron of cell thickness necessary to drive the material between optical states may vary depending on the composition of the material, but that the determination of necessary voltages is well within the skill in the art in view of the instant disclosure.

If the high electric field necessary to untwist the liquid crystal molecules is maintained, the liquid crystal directors will be homeotropically aligned so that the material is transparent. If the field is slowly removed, the liquid crystal orientation will reform to the light scattering state of FIG. 3, presumably because slow removal allows a significant proportion of the material to enter the turbid phase. When the field is quickly removed, the orientation will reform to the light reflecting state of FIG. 4. The intensities of reflectivity reflected between the reflecting state of FIG. 4 and the scattering state of FIG. 3 are stable grey scale reflectivities. Of course, the intensity value of the reflecting and scattering states may vary as the composition of the material varies, but the grey scale is defined by the range of intensities therebetween.

At voltages less than that which will transform the material from the reflecting state of FIG. 4 to the scattering state of FIG. 3, grey scale states which are themselves stable at zero field are obtained. The reflection from the material in these grey scale states is stable because a proportion of the material is in the planer reflecting texture of FIG. 4 and a proportion of the material is in the focal conic scattering texture of FIG. 3, both of which are stable in the absence of a field.

Thus, for example, if the material is in the reflecting state of FIG. 4 and an electric field pulse is applied having a voltage insufficient to drive all of the liquid crystal 16 into the focal conic texture shown at 30 in FIG. 3, i.e., insufficient to drive the material completely to the scattering state, the material will reflect colored light of an intensity that is proportional to the amount of material that remains in the planar reflecting texture. The reflectivity will thus be lower than that reflected from the material when all of the chiral nematic liquid crystal is in the planar reflecting texture, but still higher than when switched completely to the focal conic scattering texture. As the voltage of the electric field pulse is increased, more of the chiral material is switched from the planar reflecting texture to the scattering focal conic texture and the reflectivity decreases further until the voltage of the pulse is increased to the point where all or most of the material enters the turbid phase from which it relaxes and is completely switched to the scattering state. If the voltage of the pulse is increased still further, the intensity of reflection begins to increase again until the magnitude of the pulse is sufficient to untwist most of the chiral molecules so that they will again reform to the planar light reflecting texture when the pulse is quickly removed and the material is again in the light reflecting state of FIG. 4.

If the material is in the focal conic scattering state of FIG. 3, an applied electric field pulse will have a much less dramatic effect on the reflectivity of the cell than when it starts in the planar texture, until the voltage reaches a magnitude sufficient to untwist the chiral material, whereby it will reform to the light reflecting state of FIG. 4, as described above, when the field is removed. Grey scale when the material starts in the focal conic texture appears to result when a proportion of the molecules untwist and homeotropically align as a result of the application of the field. This proportion of molecules then relaxes to the planar reflecting texture upon removal of the field.

The response of a cell as described above is illustrated in FIG. 5, which shows the response of the material prepared in Example 1 to varying pulse voltages.

Figure 5:
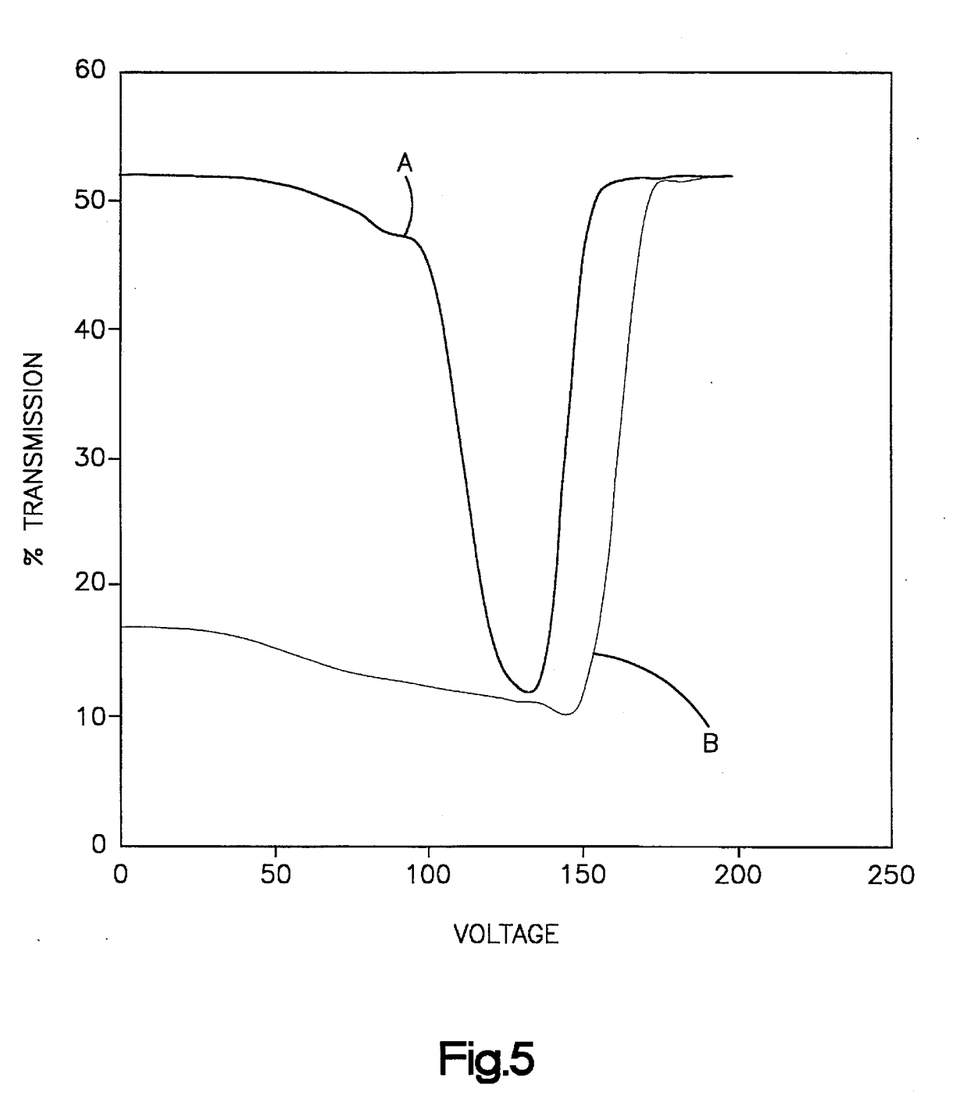
FIG. 5 is a plot of the electro-optic response of a cell to AC pulses of varying voltages demonstrating grey scale reflection in the voltage range of about 30 and 140 volts starting from the planar texture, and between about 140 and 180 starting from the focal conic.

The reflectivity of the cell in response to AC pulse of varying voltages was measured. In the measurement, 100 millisecond, 1 KHz AC pulses were used. For this material an applied pulse above about 180V switched the cell into the reflecting state independent of whether the cell was in the scattering or reflecting state prior to the pulse. Maximum reflection, i.e., transmission, is observed here. The material exhibited maximum scattering when a voltage i.n the 130 to 140V range was applied, regardless of whether the material was in the planar or focal conic texture prior to the pulse.

The grey scale response of the cell in response to pulses of varying voltage is also seen in FIG. 5. Here the voltage of the pulse was varied and the reflection (% transmission) from the cell was measured. Curve A is the response of the cell when the material is in the reflecting state prior to each pulse. Prior to each pulse plotted on curve A the material was subjected to a high AC pulse to ensure that it was completely in the reflecting state prior to the pulse. When the voltage of the pulse is below about 30V, the reflection of the cell is not significantly affected. When the voltage of the pulse is between about 40V and 110V, the reflectivity of the cell decreases approximately linearly as the voltage of the pulse is increased. Grey scale reflectivity is observed in this voltage range. In each case the material continued to reflect after the pulse was removed. When the voltage of the pulse was increased to from about 120 to 130V, the material was in the scattering state and exhibited near maximum scattering. When the magnitude of the pulse was increased still further, above about 150 to 160V, the reflectivity of the cell increased until the reflectivity approximated its original value, i.e., that of the reflecting state, above 180V.

Curve B shows the response of the cell when the material was initially in the focal conic scattering state prior to the AC pulse. Here the reflectivity of the cell does not significantly change for AC pulses below about 30V. Between about 50 and 150V the scattering actually increases slightly and maximum scattering is observed from the cell. Above about 160V the transmission quickly increased and the cell switched to the reflecting state approximating the maximum transmission above about 180V.

It can be seen that the linear relationship of the grey scale to voltage is much more pronounced, and the grey scale more gradual, when the material starts from the planar texture. Accordingly, most practical applications of the grey scale phenomenon will likely employ the material starting from the planar texture.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A light modulating polymer-free reflective cell comprising cell wall structure and a chiral nematic liquid crystal light modulating material having positive dielectric anisotropy and a pitch length effective to reflect light in the visible spectrum, said cell wall structure and liquid crystal cooperating to form focal conic and twisted planar textures that are stable in the absence of a field, and means for addressing said liquid crystal material, said means adapted to selectively establish an electric field pulse of a magnitude effective to transform at least a portion of said liquid crystal from a focal conic texture to a light reflecting twisted planar toxture, and an electric field pulse of a magnitude effective to transform at least a portion of said liquid crystal from a light reflecting twisted planar texture to a focal conic texture.

2. The cell as claimed in claim 1 wherein the liquid crystal exhibits a stable light reflecting twisted planar structure following sudden removal of an electric field pulse effective to homeotropically align the liquid crystal, and a stable light scattering focal conic texture following removal of an electric field pulse below that which will homeotropically align the liquid crystal.

3. A method of addressing a light modulating polymer-free cell comprising a chiral nematic liquid crystalline light modulating material having positive dielectric anisotropy and a pitch length effective to reflect light in the visible spectrum, cell wall structure cooperating with said liquid crystal to form focal conic and twisted planar textures that are stable in the absence of a field, and means for addressing said liquid crystal material, said method comprising selectively applying electric field pulses to said material of a magnitude effective to transform at least a portion of said liquid crystal from a focal conic texture to a light reflecting twisted planar texture, or to transform at least a portion of said liquid crystal from a light reflecting twisted planar texture to a focal conic texture.

4. The method according to claim 3 comprising selectively switching said material to a light reflecting twisted planar texture following the sudden removal of an electric field pulse of a magnitude sufficient to homeotropically align the liquid crystal, and a light scattering focal conic texture following removal of an electric field pulse of a magnitude below that which will homeotropically align the liquid crystal.

5. The method according to claim 3 comprising applying square A.C. voltage pulses.

6. A method of selectively adjusting the intensity of reflection of colored light from a polymer free chiral nematic liquid crystalline light modulating material having positive dielectric anisotropy and a pitch length effective to reflect light in the visible spectrum, and cell wall structure cooperating with said liquid crystal to form focal conic and twisted planar textures that are stable in the absence of a field, between a maximum and a minimum intensity, the method comprising subjecting said material to an electric field pulse of sufficient duration and voltage to cause a first proportion of said chiral nematic material to exhibit a twisted planar texture in the absence of a field and a second proportion of said chiral nematic material to exhibit a focal conic texture in the absence of a field, whereby said material will continuously reflect a selected intensity between said maximum and minimum that is proportional to the amount of said material in said focal conic and twisted planar textures in the absence of a field.

7. A light modulating polymer-free device comprising cell wall structure and chiral nematic liquid crystalline light modulating material having positive dielectric anisotropy and a pitch length effective to reflect light in the visible spectrum, said cell wall structure and liquid crystal cooperating to form focal conic and twisted planar textures that are stable in the absence of a field, wherein a first proportion of said material exhibits a twisted planar texture in the absence of a field and second proportion of said material exhibits a focal conic texture in the absence of a field, and means for establishing an electrical field through said material, said means adapted to provide an electric field pulse of sufficient amplitude and duration to change the proportion of said material in said twisted planar and focal conic textures, whereby the intensity of light reflected may be selectively adjusted.

8. The device according to claim 1 or 7 wherein said cell wall structure is treated to align the liquid crystal.

9. The device according to claim 1 or 7 wherein said cell wall structure is treated to homeotropically align said liquid crystal.

10. The device according to claim 7 wherein said means for establishing a field through said material is adapted to provide an AC pulse.

* * * * *

UNITED STATES PATENT AND TRADEMARK OFFICE
CERTIFICATE OF CORRECTION

PATENT NO : 5,453,863
DATED : September 26, 1995
INVENTOR(S) : John West and Deng-Ke Yang

It is certified that error appears in the above-identified patent and that said Letters Patent are hereby corrected as shown below:

In column 1, lines 5-8, delete the paragraph and substitute therefor:

---The United States government has a paid-up license in this invention and may have the right in limited circumstances to require the patent owner to license others on reasonable terms as provided for by the terms of Grant DMR 89-20147, awarded by the National Science Foundation, and contract No. 972-90-C-0037, awarded by Advanced Research Projects Agency.---

Signed and Sealed this

Twenty-ninth Day of May, 2001

*Attest:*

NICHOLAS P. GODICI

*Attesting Officer*     *Acting Director of the United States Patent and Trademark Office*

(12) EX PARTE REEXAMINATION CERTIFICATE (5564th)
United States Patent
West et al.

(10) Number: US 5,453,863 C1
(45) Certificate Issued: Oct. 17, 2006

(54) MULTISTABLE CHIRAL NEMATIC DISPLAYS

(75) Inventors: John West, Munroe Falls, OH (US); Deng-Ke Yang, Kent, OH (US)

(73) Assignee: Darpa, Arlington, VA (US)

Reexamination Request:
No. 90/007,469, Mar. 18, 2005

Reexamination Certificate for:
Patent No.: 5,453,863
Issued: Sep. 26, 1995
Appl. No.: 08/057,662
Filed: May 4, 1993

Certificate of Correction issued May 29, 2001.

Related U.S. Application Data

(63) Continuation-in-part of application No. 07/694,840, filed on May 2, 1991, now abandoned, and a continuation-in-part of application No. 07/885,154, filed on May 18, 1992, now Pat. No. 5,384,067, and a continuation-in-part of application No. 07/969,093, filed on Oct. 30, 1992, now Pat. No. 5,437,811.

(51) Int. Cl.
*G02F 1/137* (2006.01)
*C09K 19/02* (2006.01)

(52) U.S. Cl. .......................................... 349/35; 349/180
(58) Field of Classification Search ........................ None
See application file for complete search history.

(56) References Cited

U.S. PATENT DOCUMENTS

| | | | |
|---|---|---|---|
| 3,578,844 A | 5/1971 | Kettering et al. | |
| 3,704,056 A | 11/1972 | Wysocki et al. | |
| 3,806,230 A | 4/1974 | Haas et al. | |
| 3,891,307 A | 6/1975 | Tsukamoto et al. | |
| 3,909,114 A | 9/1975 | Haas et al. | |
| 3,936,815 A | 2/1976 | Kogure et al. | |
| 3,938,136 A | 2/1976 | Kawakami | |
| 4,097,127 A | 6/1978 | Haas et al. | |
| 4,649,517 A | 3/1987 | Kitazima et al. | |

FOREIGN PATENT DOCUMENTS

| | | |
|---|---|---|
| JP | 47-23220 | 6/1972 |
| JP | 57-53572 | 5/1974 |
| JP | 52-36656 | 9/1977 |
| JP | 59-155880 | 9/1984 |

OTHER PUBLICATIONS

"Electric Field Induced Texture Changes in Certain Nematic/Cholesteric Liquid Crystal Mixtures", Greubel et al., Molecular Crystals and Liquid Crystals, published 1973.
Liquid Crystals, S. Chandresakher, Cambridge University Press, published 1977.
"Electric Field Effects and Two Frequency Colour Switching in the Cholesteric and Blue Phases of Nematic/Cholesteric Mixtures", Gleeson et al., vol. 129, Molecular Crystals and Liquid Crystals, published 1984.
"Dynamics of Texture Transitions in Cholesteric–Nematic Mixtures", Dir et al., vol. 25, Molecular Crystals and Liquid Crystals, published 1974.
B. Bahudur, "Liquid Crystals, Applications and Uses," Book 3, Chapter 20, p. 307, (1992).
Morimoto et al., "Chiral Nematic Liquid Crystals and Their Application to Display Devices," National Technical Report, vol. 22 (No. 3), p. 213–224, (Jun. 1976).
P.G. De Gennes and J. Prost, "The Physics of Liquid Crystals," 2nd ed., Clarendon Press, Oxford, p. 288–293, 1993.

(Continued)

*Primary Examiner*—Erik Kielin (57) ABSTRACT

A light modulating reflective cell comprising a polymer-free chiral nematic liquid crystalline light modulating material is disclosed. The cell includes nematic liquid crystal having positive dielectric anisotropy and chiral material in an amount effective to form focal conic and twisted planar textures. The chiral material has a pitch length effective to reflect light in the visible spectrum, wherein the focal conic and twisted planar textures are stable in the absence of a field and the liquid crystal material is capable of changing textures upon the application of a field.

OTHER PUBLICATIONS

Hans Kelker and Rolf Hatz, "Handbook of Liquid Crystals," p. 213–214, (1980).

Kerllenevich and Coche, "Molecular Crystals and Liquid Crystals," p. 149–161, (1985).

P.L. Finn and P.E. Cladis, "Cholesteric Blue Phases in Mixtures and in an Electric Field," p. 159–191, (1982).

Shouichi Matsumoto and Ichiro Tsunoda, "Liquid Crystals—Fundamentals & Applications," 1st ed., Kogyo Chosa-kai (Japan), p. 2–4, (May 20, 1991).

Japan Society for the Promotion of Science, "Dictionary of Liquid Crystals," Book, 1st ed., Baifukan Co., Ltd. (Japan), p. 1–15, (Aug. 28, 2002).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *